United States Patent [19]

Sinclair

[11] Patent Number: 5,785,930
[45] Date of Patent: Jul. 28, 1998

[54] APPARATUS FOR BURNING A WIDE VARIETY OF FUELS IN AIR WHICH PRODUCES LOW LEVELS OF NITRIC OXIDE AND CARBON MONOXIDE EMISSIONS

[76] Inventor: Douglas Stewart Sinclair, Rte. 1 Box 11A, Jonesburg, Mo. 63351

[21] Appl. No.: 715,177

[22] Filed: Sep. 17, 1996

[51] Int. Cl.$^6$ ............................................. F01N 3/10
[52] U.S. Cl. .................. 422/173; 422/177; 422/198; 422/211
[58] Field of Search ........................ 422/171, 173, 422/177, 198, 211; 423/247, 239.1

[56] References Cited

U.S. PATENT DOCUMENTS 3,870,474  3/1975  Houston ................................. 422/171
4,135,885  1/1979  Wormser et al. ..................... 422/173
5,137,703  8/1992  Lichtin et al. ...................... 423/239.1
5,330,727  7/1994  Trocciola et al. .................... 423/247

OTHER PUBLICATIONS

Irvin Glassman, *Combustion*, 1987 pp. 329–331.

*Primary Examiner*—Hien Tran
*Attorney, Agent, or Firm*—Senniger, Powers, Leavitt & Roedel

[57] ABSTRACT

An apparatus that can burn a wide variety of fuels and which produces high combustion efficiency while at the same time putting out low levels of nitric oxide and carbon monoxide pollution. In this apparatus, pollution is reduced by simultaneously controlling the temperature of combustion and subjecting the combustion gasses to the catalytic effects of an inexpensive catalyst held at temperatures of up to 1400 (°C). After the combustion process is essentially complete, the combustion efficiency of the apparatus is increased by absorbing heat from the combustion gasses before they are passed out the exhaust.

10 Claims, 3 Drawing Sheets

5,785,930

1

APPARATUS FOR BURNING A WIDE VARIETY OF FUELS IN AIR WHICH PRODUCES LOW LEVELS OF NITRIC OXIDE AND CARBON MONOXIDE EMISSIONS

BACKGROUND - FIELD OF INVENTION

This invention relates to the control of gaseous pollution produced by burning hydrocarbon fuel in air.

BACKGROUND - DESCRIPTION OF PRIOR ART

It is common practice to divide the $NO_x$ pollution from common combustion processes into two categories: prompt $NO_x$ and thermal $NO_x$. Prompt $NO_x$ forms when fuel bound nitrogen is oxidized and thermal $NO_x$ forms when nitrogen in the air is oxidized during combustion. It has been widely accepted that thermal $NO_x$ is the largest component of $NO_x$ emissions coming from the burning of our most common liquid and gaseous hydrocarbon fuels. Nitric oxide (NO) is the earliest species of $NO_x$ to form within the heated combustion gasses. This initial nitric oxide reacts with oxygen in the air to produce higher oxides such as $NO_2$ and $N_2O_5$. The exact point at which these higher oxides form is somewhat in question and therefore NO and the higher oxides like $NO_2$ and $N_2O_5$ are generally lumped together into one category called $NO_x$. Because we are interested in stopping the formation of $NO_x$ at its beginning, the rest of this discussion will be limited to the initial species to form and that is NO (nitric oxide).

At low temperatures the nitrogen molecule is relatively stable and NO does not readily form in air at room temperatures. However, when nitrogen in the air is heated during combustion, the triple bonds in the nitrogen molecule are weakened enough that it is susceptible to attack by oxygen radicals as well as other species present in combustion gasses. It was shown by author Irvin Glassman, in his book *Combustion* (FIG. 1, pg. 331, 1987), that NO formation occurs relatively late in the combustion process.

Evidence sighted by Glassman (pg. 329-330) points out that NO reduction can be accomplished by reducing the temperature of the combustion gasses. It has been widely accepted that varying the air/fuel ratio of a premixed flame can have a significant effect on the amount of NO formed. This is partly due to the variations in combustion temperature that accompany variations in air/fuel ratios. In other words, it should be obvious that putting excess air into the combustion zone will cause a bulk cooling of the combustion gasses.

Unfortunately, while a bulk cooling of the combustion gasses can lower NO formation somewhat, this is limited by the fact that combustion processes are usually quite turbulent and within the microscopic turbulent eddies of a flame the temperatures can still be high enough for NO to readily form. This is especially true for flames where the fuel and air are not premixed but rather fuel is injected into the combustion zone. Not only is excess air limited in its ability to control the formation of NO, but putting excess air into the combustion zone has the big disadvantage of lowering the combustion efficiency as some of the heat of combustion is carried away by the excess air.

One widely used method of lowering NO emissions is by Exhaust Gas Recirculation (EGR). This also has the effect of a bulk cooling of the combustion gasses but without adding extra oxygen to the mixture which could take part in the formation of NO. Again, the main disadvantages here are

2 that EGR won't control the high temperatures in the turbulent eddies in the flame and EGR also lowers the efficiency of the combustion just as excess air does.

Another widely used method of controlling both nitric oxide (NO) and carbon monoxide (CO) emissions is to pass the exhaust gasses through a catalytic converter. Most current catalytic converters use noble metals such as platinum and rhodium in their catalysts with the obvious disadvantage that these metals are somewhat rare and quite expensive. Other problems with the noble metal catalysts are that they are easily poisoned by substances like lead in the fuel and also they can become oxidized at high temperatures, causing them to loose their effectiveness.

There is a vast array of catalytic devices currently in use or proposed in the prior art, but in virtually all these devices the catalyst is placed in the exhaust far downstream from the combustion zone. By the time the combustion gasses reach the catalyst in these devices, the nitric oxide has already formed and stabilized and the problem of eliminating it is much more difficult than if the NO formation is stopped at its beginning. That is why most previous catalytic devices will only work with rather exotic catalyst formulations which usually included some of the noble metals. If these catalytic devices were employed when the nitric oxide was newly formed and still in a highly excited state, they may well be able to work with much simpler and cheaper catalysts than they must otherwise employ. Indeed, any catalytic device should be much more effective if placed right in the combustion zone. At that point the NO levels are still quite low and any NO that is present is still in a highly excited state. It is much easier to decompose a molecule in an excited state than it is to decompose the same molecule after it has stabilized.

Unfortunately, the heat in the combustion zone is usually intense enough to destroy most of the previous catalytic devices because they do not provide any means of cooling the catalyst.

OBJECTS AND ADVANTAGES

Some objects and advantages of the present apparatus are:

(a) to produce very low levels of NO and CO emissions while still maintaining a high combustion efficiency;

(b) to produce very low levels of NO and CO emissions without using expensive noble metal catalysts;

(c) to provide sufficient cooling for the catalyst so that the catalyst can be placed within the final stages of the combustion zone, that is to say, within a few centimeters of the visible region of the flame; and (d) to make the apparatus small and light weight so that it can be incorporated into a wide variety of power plants.

DRAWING FIGURES

Figure 1:
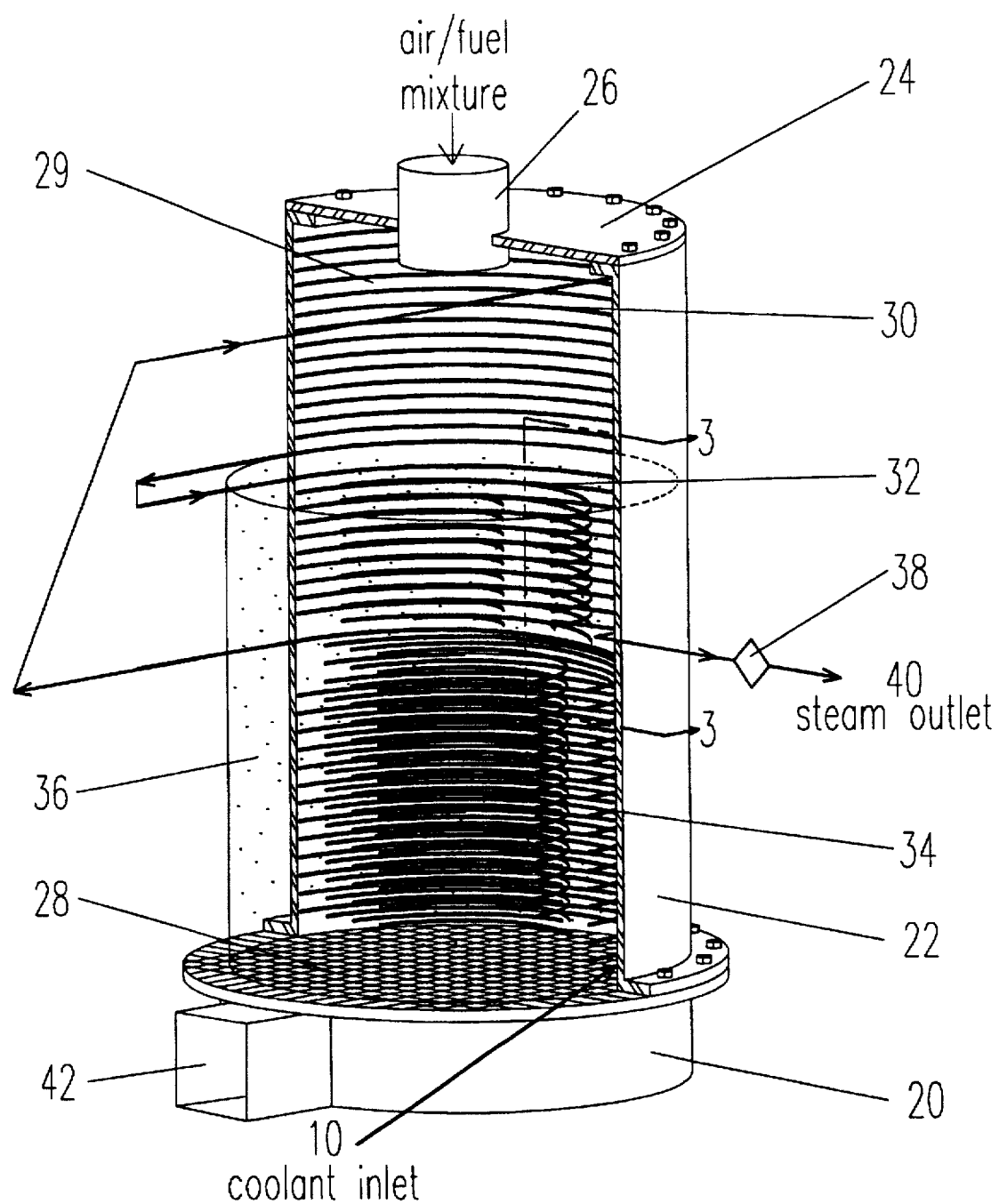
FIG. 1 is a cut away view of the apparatus.

| Reference Numerals In Drawings |
| --- |
| 10 coolant inlet |
| 20 exhaust bonnet |
| 22 outer casing |

-continued

Reference Numerals In Drawings 24 top plate
26 burner
28 support screen
29 combustion chamber
30 combustion chamber coil
32 combustion temperature control coil
34 exhaust cooling coil
36 granular catalyst
38 thermocouple
40 steam outlet
42 exhaust outlet
44 combustion temperature control coil spacing
50 exhaust cooling coil spacing

DESCRIPTION - FIGS. 1 TO 3

Figure 3:
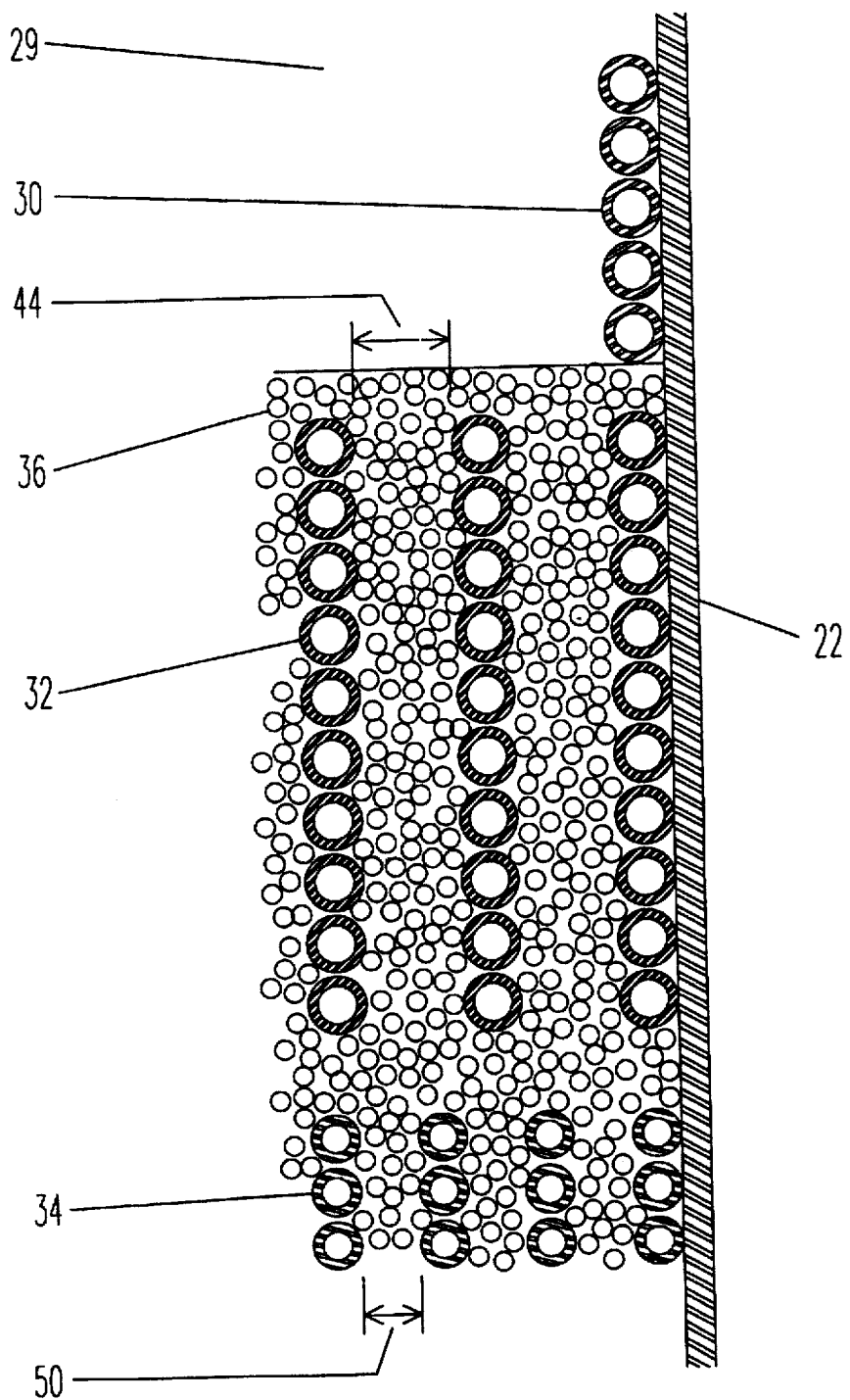
FIG. 3 is a view in detail of the portion indicated by section lines 3—3 in FIG. 1.

FIG. 1 shows a cut away view of one embodiment of the apparatus. At the bottom of FIG. 1 is an exhaust bonnet 20. On the side of exhaust bonnet 20 is an exhaust outlet 42. A support screen 28 is bolted between the flange on exhaust bonnet 20 and the bottom flange on an outer casing 22. Just inside the bottom of outer casing 22 and above support screen 28 is a coolant inlet 10. Coolant inlet 10 is attached to the bottom of an exhaust cooling coil 34. Support screen 28 covers the entire bottom of outer casing 22 and holds a granular catalyst 36 in place. Granular catalyst 36 is a loose, pourable, granular material which is capable of withstanding high temperatures. Granular catalyst 36 fills in the voids around exhaust cooling coil 34 and a combustion temperature control coil 32. At the outlet on the bottom of combustion temperature control coil 32 is a thermocouple 38 which is just ahead of a steam outlet 40. Above the surface of catalyst 36 is a combustion chamber 29, which is an open chamber surrounded by a combustion chamber cooling coil 30. Section lines 3—3 show the location where the parts detailed in FIG. 3 are from. The top of combustion chamber 29 is covered by a top plate 24, which bolts to the top flange of outer casing 22. In the center of top plate 24 is a burner 26. Burner 26 can be any standard type burner which is capable of mixing fuel with an air stream and injecting a flame into combustion chamber 29.

Figure 2:
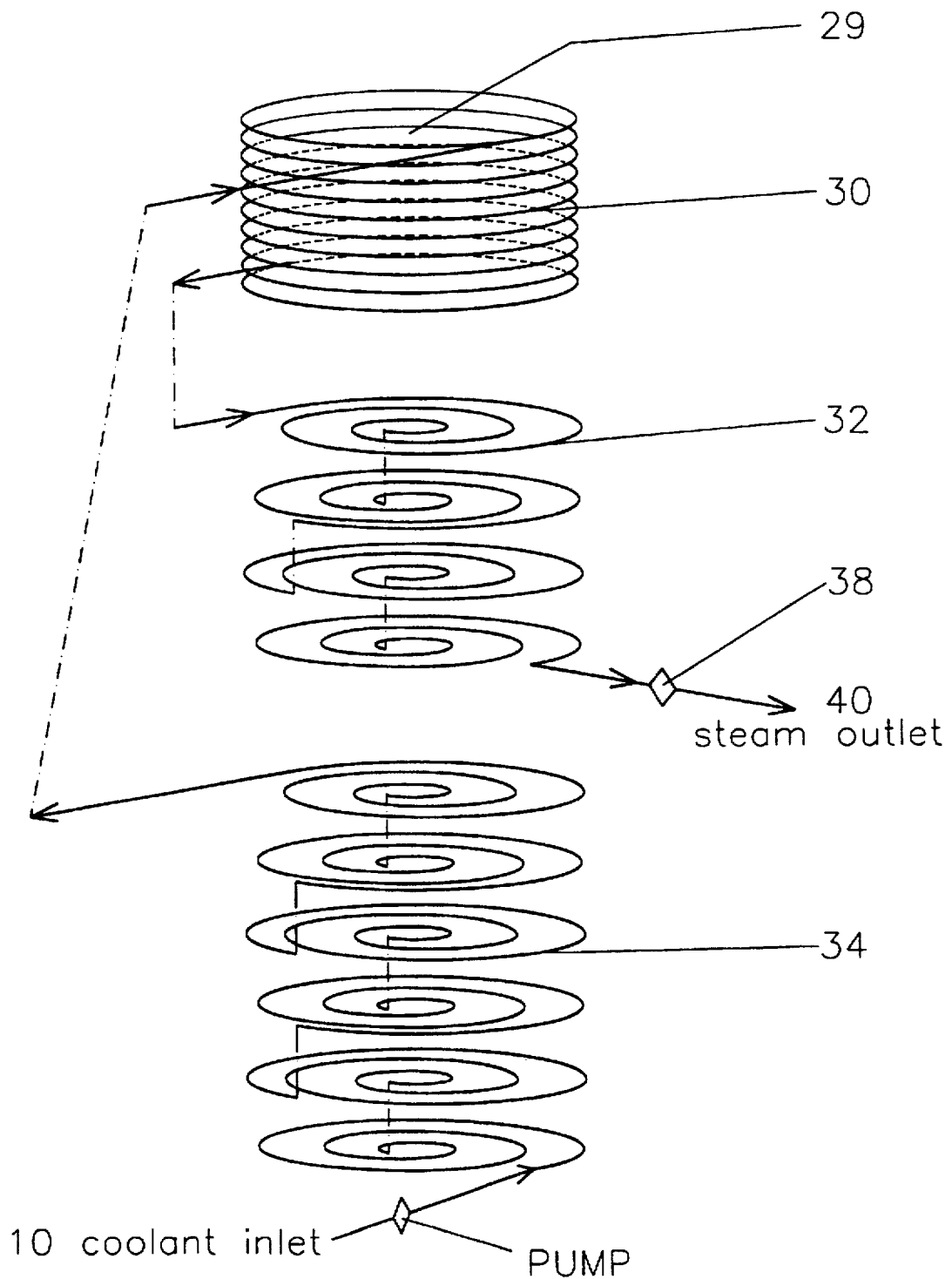
FIG. 2 is an exploded view of the coolant tube coils inside the apparatus.

FIG. 2 is an exploded view of the coolant tube routing through the apparatus. Coolant is pumped into coolant inlet 10 at the bottom of exhaust cooling coil 34. The coolant moves up through the spiraled layers of coil 34 and exits at the top of the coil. The coolant is then piped to the top of combustion chamber coil 30. Combustion chamber coil 30 forms a jacket around the outside of combustion chamber 29. The coolant moves down through combustion chamber coil 30 and exits coil 30 at the bottom. The coolant is then piped down to the top of combustion temperature control coil 32. The coolant then moves down through the spiraled layers of coil 32 and exits at the bottom of the coil. At the exit of coil 32 is thermocouple 38 which monitors the temperature of the steam leaving steam outlet 40.

Please note that coils 32 and 34 are both formed as layers of spirals laid one on top of the other. This configuration helps to keep the temperature uniform across any particular given elevation of the apparatus.

FIG. 3 is a view in detail of the portion indicated by section lines 3—3 in FIG. 1. The top part of FIG. 3 shows the bottom of combustion chamber 29. On the outer edge of combustion chamber 29 is a cut away view of the bottom of combustion chamber coil 30. Outside of coil 30 is outer casing 22. Below combustion chamber 29 is the surface of granular catalyst 36. Shown buried within catalyst 36 is a cut away view of part of the outer layers of combustion temperature control coil 32. The spacing between the tubes of coil 32 is shown as combustion temperature control coil spacing 44. Below coil 32 and buried within the same catalyst 36 is a cut away view of part of the top layers of exhaust cooling coil 34. The spacing between the tubes of coil 34 is shown as exhaust cooling coil spacing 50.

OPERATION OF THE APPARATUS

The operation of this embodiment of the apparatus begins when burner 26 injects a continuous flame into combustion chamber 29. Most of the heat of combustion is released in combustion chamber 29 and the gasses here reach temperatures of about 1200 (°C.). Combustion chamber coil 30 helps hold down the temperature of the gasses in combustion chamber 29 and it also keeps the upper part of outer casing 22 from overheating and burning up.

As the fuel and air is injected into combustion chamber 29 the superheated combustion gasses in the chamber, which are still in the final stages of the combustion process, are pushed down through the interstitial spaces in granular catalyst 36, which fills the voids around combustion temperature control coil 32. The last of the heat of combustion is released into the upper levels of catalyst 36 and temperatures in the upper 2 centimeters or so of granular catalyst 36 can run as high as 1400 (°C.). As the combustion gasses move down through catalyst 36, they cool slowly as combustion temperature control coil 32 draws heat out of the catalyst until at the bottom of coil 32, catalyst 36 is at about 600 (°C.).

The desire here is to control the temperature at which the final products of combustion are formed. The temperature must be high enough to complete the burning of the fuel at a reasonably fast rate and yet low enough to hold down the formation of NO.

This compromise seems to work best when the combustion gasses are taken from a temperature of about 1200 (°C.) or 1300 (°C.) and gradually lowered to about 600 (°C.) or 700 (°C.). Unfortunately, common structural materials which will work well for the cooling coils, like stainless steel or even the nickel based or cobalt based superalloys are not able to survive very long at these high temperatures. That is why granular catalyst 36 is used as a thermal link between the combustion gasses and combustion temperature control coil 32. Depending on the desired operating temperature of the tubing material used and the heat transfer coefficient of the granular catalyst used, the length of spacing 44 of combustion temperature control coil 32 within catalyst 36 can be from about 2 centimeters up to 4 centimeters or more. The granules in direct contact with coil 32 transfer heat to the coil easily and are thus held to very near the same temperature as coil 32. This is typically less than 700 (°C.). But as you move away from coil 32 the granules quickly rise in temperature as heat transfer to coil 32 becomes more difficult. The wider you make spacing 44, the higher the maximum temperature of granular catalyst 36 between the tubes of coil 32.

The prototype of this apparatus uses aluminum oxide granules and stainless steel tubing. With these materials, a length for spacing 44 of about 3 centimeters seems to work well for combustion temperature control coil 32.

In addition to serving as a thermal link between the combustion gasses and coil 32, any type material which is used for granular catalyst 36 should also be able to act as a catalyst. At the high temperatures used here, the plain, uncoated aluminum oxide granules used in the prototype of this apparatus seemed to be an effective catalyst in oxidizing CO to $CO_2$. This was shown by the low CO readings recorded during tests of this embodiment of the apparatus.

When the combustion gasses move down past the bottom level of combustion temperature control coil 32, they enter the area of exhaust cooling coil 34. The main function of exhaust cooling coil 34 is to draw as much heat as possible out of the combustion gasses. This is done to increase the combustion efficiency of the apparatus by lowering the amount of heat lost out the exhaust. At the bottom of coil 34 the combustion gasses, granular catalyst 36 and cooling coil 34 should all be very nearly at the same temperature as the coolant entering coolant inlet 10. In a normal application, with a closed coolant loop, this would typically be something less than about 100 (°C.).

The length of exhaust cooling coil spacing 50, between the tubes of exhaust cooling coil 34, is based on a compromise between different criteria than were used for spacing 44 of combustion temperature control coil 32. For exhaust cooling coil 34, the length of spacing 50 between tubes of the coil is a compromise between easier heat transfer from granular catalyst 36 to coil 34 and more area for combustion gasses to flow through granules 36 around coil 34. A reasonable compromise between these factors gives a length for tube spacing 50 of about 2 centimeters for exhaust cooling coil 34.

As the combustion gasses move out the bottom level of exhaust cooling coil 34, they pass through support screen 28 which holds granules 36 up in place. Below support screen 28, the combustion gasses enter exhaust bonnet 20, which covers the bottom of outer casing 22. From exhaust bonnet 20 the combustion gasses are free to move out exhaust outlet 42.

OTHER EMBODIMENTS

The previously described embodiment of this apparatus can be used to burn most liquid or gaseous fuels. To burn solid fuels such as coal or wood, or to burn fuels which leave behind incombustible residue, combustion chamber 29 should not sit directly above granular catalyst 36. When combustion chamber 29 sits directly above granular catalyst 36 and incombustible residue is produced in combustion chamber 29, this residue would fall into granular catalyst 36 and clog the interstitial spaces between the granules. This would stop the movement of combustion gasses through catalyst 36.

To burn fuels which produce an incombustible residue, the combustion chamber should sit to one side of outer casing 22. The bottom of the combustion chamber could then contain a means of removing any incombustible residue which accumulates during operation of the apparatus.

To burn solid fuels, the combustion chamber should sit beside outer casing 22 which holds catalyst 36. The bottom of the combustion chamber should have a grating to hold the fuel during combustion. Air for combustion would then be pumped up through the solid fuel and the combustion gasses would move out the top of the combustion chamber and be conducted over and down through catalyst 36. From that point the operation of the apparatus would be the same as described for the first embodiment, which is shown in FIG. 1.

SUMMARY

Tests of various prototypes of the apparatus as shown in FIG. 1 have shown that it yields high combustion efficiency while at the same time putting out very low levels of NO and CO pollution. This design does not require expensive noble metal catalysts, such as platinum, to operate. The prototype of the embodiment shown in FIG. 1 is a boiler which is smaller and lighter than conventional boilers of comparable power output and when done on a mass production basis this boiler design should be easy to manufacture.

While suggestions were made for other embodiments of this apparatus which could be used to burn solid fuels or fuels which produce incombustible residue the main difference between the other embodiments and the first embodiment was in the combustion chamber design. The details of the combustion chamber design must be dictated by the type of fuel used. For any design of combustion chamber used, the main requirement for this apparatus to work correctly is that the combustion gasses must be pushed into granular catalyst 36 while the gasses are still in the final stages of the combustion process.

Because there are a wide variety of possibilities for the configuration and placement of the combustion chamber and because the details of the combustion chamber's design do not immediately impact the function of this apparatus, please realize that the scope of this invention should not be limited to the embodiments discussed here but rather the scope should be determined from consideration of the claims made for the apparatus.

I claim:

1. An apparatus for reducing the pollutants produced by the combustion of fuel in air, comprising:
   a casing having a combustion chamber;
   a burner in communication with the combustion chamber for introducing an ignited fuel and air mixture into the combustion chamber to produce combustion gases therein;
   a layer of granular substance contained in the casing below the combustion chamber in communication therewith for receiving the combustion gases within interstices thereof;
   a plurality of coolant circulating tubular coils in the casing in at least the layer of granular substance, each coil being spaced apart from adjacent coils a predetermined distance for removing heat from the granular substance;
   said burner being positioned a predetermined distance from the layer of granular substance such that a portion of combustion of the combustion gases occurs within the interstices of the granular substance so as to reduce the formation of nitric oxide therefrom; and
   an exhaust port in the casing in communication with the combustion chamber for removing the combustion gases from the casing.

2. An apparatus as set forth in claim 1 further comprising means for circulating sufficient coolant through said coils so as to maintain the combustion gases within the interstices of the granular substance below a temperature at which a significant amount of nitric oxide is formed.

3. An apparatus as set forth in claim 1 further comprising means for circulating sufficient coolant through said coils so as to maintain the combustion gases at the top of the layer of granular substance at a temperature of approximately 1400 degrees Celsius and at the exhaust port at a temperature of approximately 100 degrees Celsius.

4. An apparatus as set forth in claim 3 wherein said coils are in the granular substance and are also positioned in the combustion chamber for removing heat therefrom.

5. An apparatus as set forth in claim 1 wherein the granular substance is composed substantially of uncoated aluminum oxide granules.

6. An apparatus as set forth in claim 5 further comprising an outlet through which coolant exits the coils, a thermocouple positioned downstream from the outlet for measuring the heat of coolant exiting the coils, said thermocouple being capable of use in controlling the flow rate of coolant.

7. An apparatus as set forth in claim 2 wherein the coolant circulating tubular coils are arranged and configured to keep the temperature uniform at similar elevations of the apparatus.

8. An apparatus as set forth in claim 7 wherein the coolant circulating tubular coils include an exhaust cooling coil positioned adjacent the exhaust port, a combustion chamber coil positioned generally in the combustion chamber, and a combustion temperature control coil positioned generally within the granular substance and adjacent the interstices of the granular substance wherein a portion of combustion of the combustion gases occurs.

9. An apparatus as set forth in claim 8 wherein the coolant circulating coils are connected such that coolant is routed to enter an inlet connected to the exhaust cooling coil and to exit an outlet connected adjacent to a bottom of the combustion temperature control coil.

10. An apparatus as set forth in claim 9 wherein the coolant circulating coils are connected such that coolant first flows through the exhaust cooling coil, then through the combustion chamber coil and then through the combustion temperature control coil.

* * * * *